Sept. 19, 1933. H. S. PARDEE 1,927,752
HYDROPNEUMATIC POWER SYSTEM
Filed Oct. 15, 1932 3 Sheets-Sheet 1
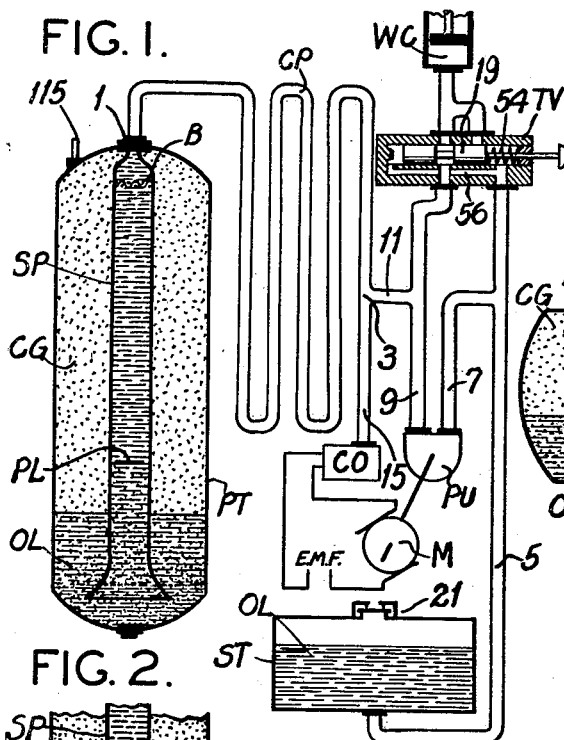
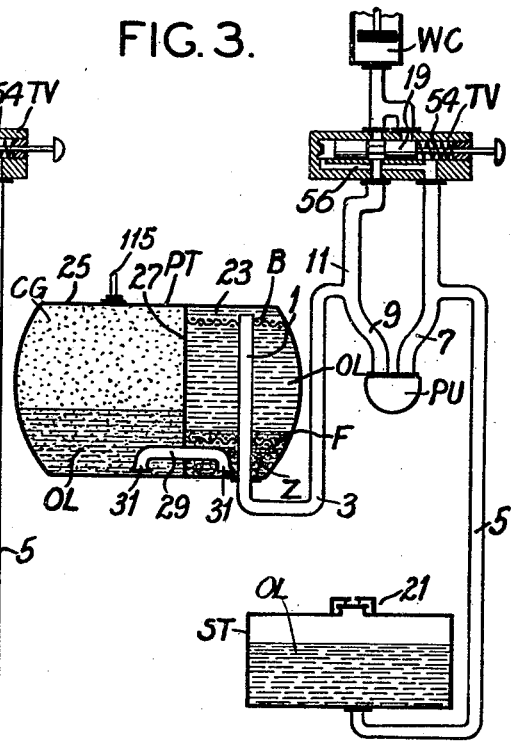
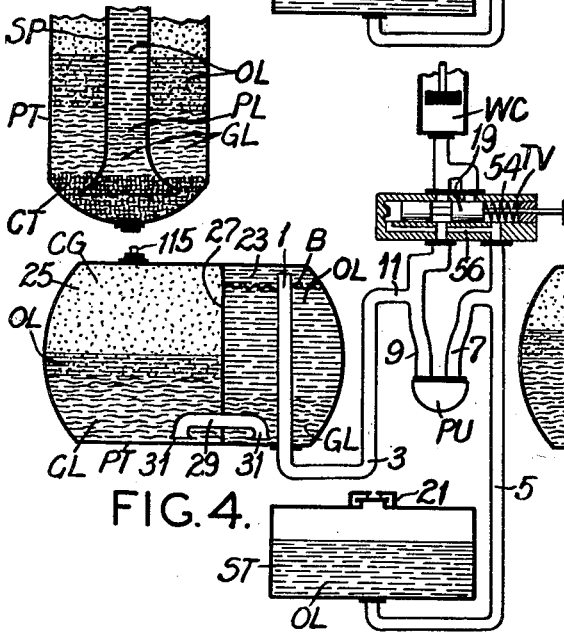
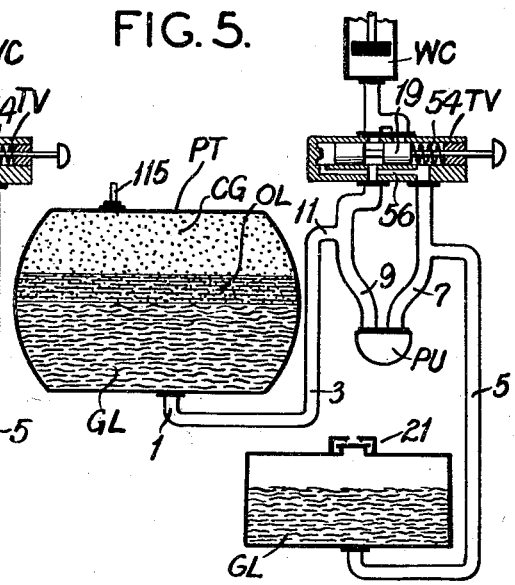

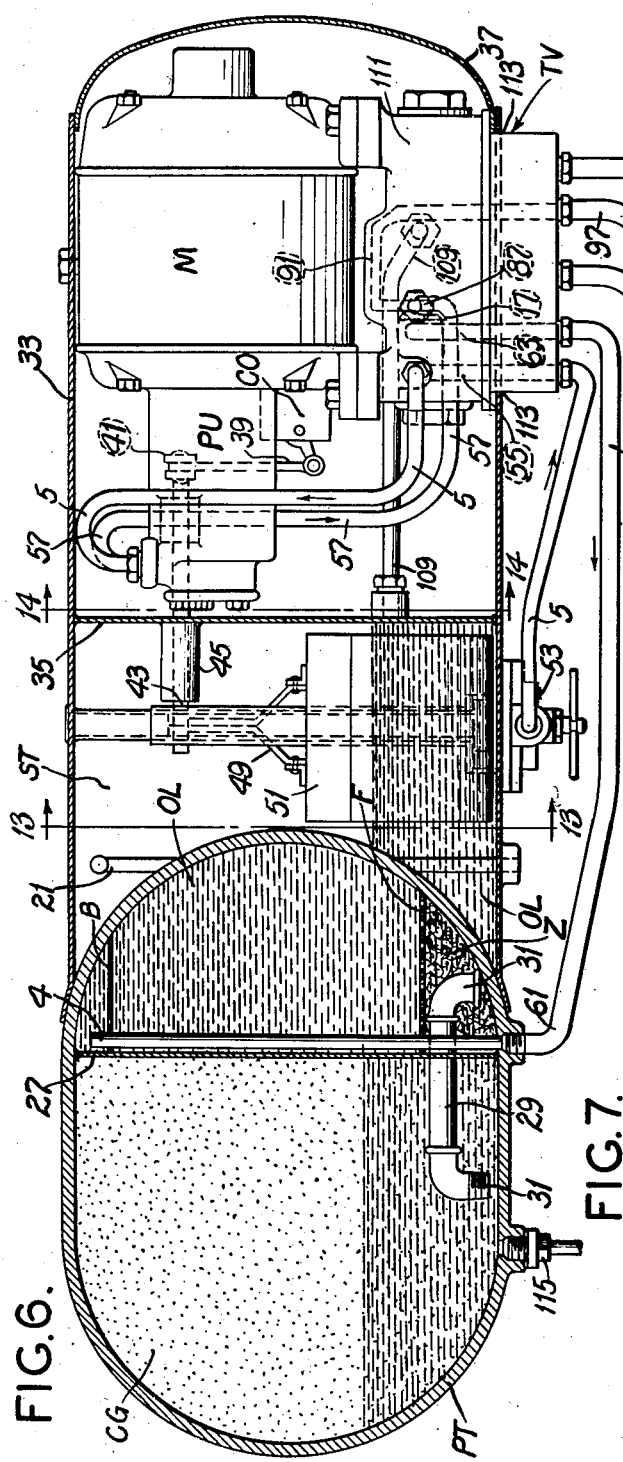

Sept. 19, 1933.   H. S. PARDEE   1,927,752
HYDROPNEUMATIC POWER SYSTEM
Filed Oct. 15, 1932   3 Sheets-Sheet 3

Harvey S. Pardee,
Inventor.
Delos G. Haynes,
Attorney.

Patented Sept. 19, 1933

1,927,752

UNITED STATES PATENT OFFICE 1,927,752

HYDROPNEUMATIC POWER SYSTEM

Harvey S. Pardee, Ravinia, Ill., assignor to Joh. Robert Blackhall, Highland Park, Ill.

Application October 15, 1932. Serial No. 637,910

13 Claims. (Cl. 103—222)

This invention relates to power systems, and with regard to certain more specific features to hydro-pneumatic power systems.

Among the several objects of the invention may be noted the provision of a power system utilizing a liquid or liquids under compression as a force-transmitting medium between a point of energy storage and work to be accomplished, the energy storage being effected in a compressed gas; the provision of apparatus of the class described in which deleterious absorption of the gas by the liquid shall be prevented; and the provision of such apparatus as shall lend itself to the manufacture of a compact, trouble-proof and effective structure for use in applications such as the braking systems of a vehicle, although this use is not to be construed as limiting. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a diagrammatic view illustrating one form of the invention;

Fig. 2 is a fragmentary view of a part of Fig. 1 illustrating a variation;

Figs. 3, 4 and 5 are views similar to Fig. 1 showing modified forms and variations of the invention, certain motorizing parts being eliminated for clarity;

Fig. 6 is a longitudinal section taken through a practical assembly embodying the principle illustrated in Fig. 3;

Fig. 7 is a longitudinal section of a valve, the side elevation of which is shown in Fig. 6;

Fig. 8 is a cross section taken on line 8—8 of Fig. 7;

Similar reference characters indicate corresponding parts throughout the several views of the drawings.

Prior difficulties

Figure 10:
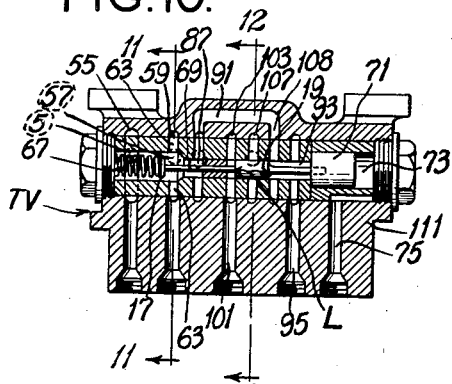
Fig. 10 is a view similar to Fig. 7 showing an alternative position of parts.
Figure 11:
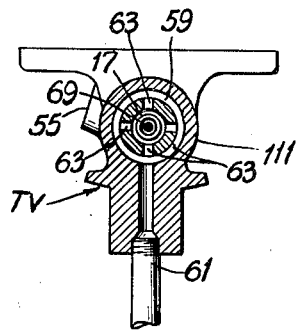
Fig. 11 is a cross section taken on line 11—11 of Fig. 10.
Figure 9:
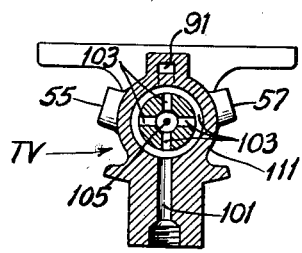
Fig. 9 is a cross section taken on line 9—9 of Fig. 7.
Figure 12:
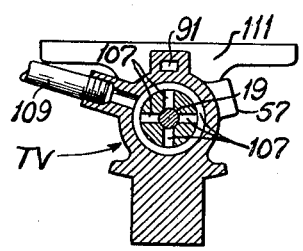
Fig. 12 is a cross section taken on line 12—12 of Fig. 10.
Figure 13:
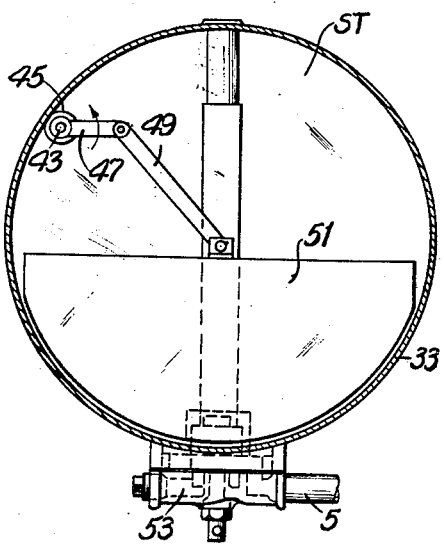
Fig. 13 is a cross section taken on line 13—13 of Fig. 6.
Figure 14:
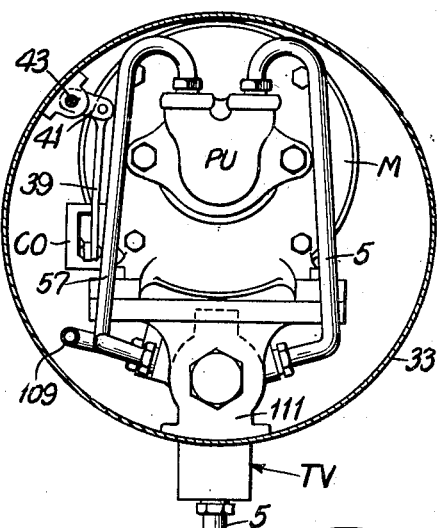
Fig. 14 is a cross section taken on line 14—14 of Fig. 6.

As indicated, the invention is for use in connection with liquid hydraulic power or liquid supply systems, wherein the liquid is in contact with gas trapped under pressure for the purpose of storing energy, and relates to means for reducing the amount of absorption of gas and preventing it from being carried out of a pressure tank in solution.

When a liquid is used for transmitting power from a pump to a work cylinder or to a hydraulic motor or when a pump is used to supply liquid from a well or a sump, it is desirable to provide a source of stored energy to assist in momentary demands for delivery in excess of the pump capacity or for delivery when the pump is idle for a time. One of the most convenient ways to store energy for these purposes is by the use of compressed air, or other gas in contact with the liquid.

When a gas is in contact with a liquid there is usually a tendency for the more active molecules of the gas to penetrate the surface film and intermingle with the molecules of the liquid. In this way some of the gas is absorbed until saturation is reached, the ultimate solubility depending upon the ease with which the two molecular species are able to mix.

When saturated liquid is drawn from a pressure tank it is replaced by unsaturated liquid from the pump, as will be shown. This lowers the concentration of gas in the liquid of the tank and further absorption takes place so that after a sufficient number of cycles of operation all of the gas in the tank may be removed and the ability to store energy is gone.

Also, when a fixed quantity of liquid is used in a hydraulic system the gradual rise of liquid in the pressure tank due to absorption causes a decrease in the standard level in other parts of the system which may disturb the balance and interfere with proper functioning. For example, a liquid level motor control switch may fail to cut in properly.

Furthermore, where a single line is run to a work cylinder and the liquid moves back and forth in the line, the gas will effervesce from the liquid during the stroke upon which the pressure is released, in much the same way that carbonic acid gas escapes from a carbonated beverage when uncapped. After a number of operations the released gas collects in the pockets of the line and work cylinder so that on subsequent pressure strokes the pocketed gas must first be compressed before full pressure is built up in the cylinder. This slows operation and increases the quantity of liquid required for each working stroke.

For the above and other reasons it is important that substantially the original quantity of gas in the pressure tank be maintained, either by making up the loss of gas or by preventing it from being carried out in solution. The prior method has certain disadvantages of structure that need not be detailed here.

Theory of the invention

I accomplish the desired result more effectively by taking advantage of certain physical laws and the use of apparatus without moving parts to virtually stop absorption at a certain point. I substantially prevent, rather than correct the difficulties, this being done in view of the following theory which has been confirmed by experience:

The phenomenon of absorption herein dealt with is fundamentally that of diffusion of a gas in a liquid. Diffusion is relatively rapid through a thin surface film, but penetration purely by diffusion into a quiet liquid even for a few inches is extremely slow, requiring months, and perhaps years in some cases. This is because the path of the entering molecule is very devious, and the length of travel for a few inches of penetration might be represented by miles. Thus, in most practical cases, absorption depends upon convection currents which carry away the more saturated solution from the surface and distribute it. The rate is dependent upon the amount of agitation and the freedom accorded to convection.

There are four principal causes of convection in practical apparatus of this class: (1) the saturated liquid is usually heavier and, inasmuch as it is formed at the top surface of the liquid in the tank, it sinks and is replaced by a less saturated and absorbing surface film; (2) currents are set up due to differences in density caused as under (1) and also by temperature changes either at the walls of the tank or between the liquid in the tank and the entering liquid; (3) agitation due to movement of the liquid upon entering or leaving the tank; and (4) agitation due to movement of the tank as a whole as when mounted on a vehicle, ship, gun carriage or the like.

The theory of this invention is to limit the amount of absorption by impeding convection and/or by increasing the length and decreasing the cross section of the path through which diffusion proper must take place without the aid of convection.

First form of the invention (Figs. 1 and 2)

Referring now more particularly to Fig. 1, index PU represents the pump, driven by the motor M, the E. M. F. of which is controlled by a conventional cut-out switch CO operated either by variation of pressure in the pressure tank PT (or, if desired, variation of liquid level in the sump tank ST between predetermined maximum and minimum limits as will be later detailed in other connections).

For brevity, I shall here designate as a "pump charge" the quantity of liquid (here oil) pumped into the pressure tank PT from the low pressure to its high pressure limit. WC represents a work cylinder, as for instance, the brake cylinder on a vehicle. TV is a three-way valve diagrammatically represented, by means of which the work cylinder can be connected at will to the source of pressure in tank PT, or to the sump tank ST from which the pump P draws its supply. The pump delivers to the work cylinder by way of said valve TV and/or to the pressure tank PT. The tank PT contains liquid and compressed gas CG, which serves to store potential energy. The gas (for instance air) is initially introduced under pressure through a suitable check valve 115 or the like.

In the form of the invention shown in Fig. 1, the storage tank PT is provided with an outlet chamber or standpipe SP which holds a total volume of liquid greater than a single pump charge. At the bottom of tank PT outside the standpipe SP is a quantity of liquid which at maximum level outside of the standpipe is greater than a single pump charge. The portion of the chamber outside of the standpipe SP constitutes a blind pressure chamber communicating downwardly with the outlet chamber to obtain a U-tube arrangement having downwardly communicating legs. Near the top of the standpipe and just under the delivery opening 1 is a baffle, screen or filter plate B which offers just enough resistance to flow to reduce the velocity of entering liquid (when liquid enters) and distribute it evenly over the cross section of the standpipe. The up-and-down velocity of the liquid in the standpipe will therefore be relatively slow, and extremely so as it spreads out at the bottom and rises and falls in tank PT outside the standpipe SP.

Due principally to cause (1) above, convection will occur in tank PT outside the standpipe but this will not proceed up the inside of the standpipe since the heaviest liquid is at the bottom. If all of the apparatus be under the same ambient temperature conditions, or, if tank PT be in the colder place, the entering liquid will be slightly warmer. The higher temperature of entering liquid may be due to no other reason than the heating caused by hydraulic friction within the pump PU. This will tend to keep the unsaturated entering liquid from the pump PU next to the top of the standpipe and temperature convection currents will not be set up in it.

Although there be slow oscillatory movement of liquid in the standpipe SP it will not be turbulent and diffusion can only proceed upwardly (if at all) in the standpipe with relatively no aid from convection. The speed of this diffusion is so extremely slow, as above pointed out, that it may be said that absorption is for all practical purposes stopped near the bottom of the standpipe. In time the liquid outside the standpipe will become saturated but the parting line PL between the saturated and unsaturated portions will remain practically distinct, as shown by the stippling. Unsaturated oil is shown by broken straight lines and saturated oil by the addition of stippling.

An additional or alternative method may also be used for inhibiting absorption. If the pipe CP leading from the liquid in contact with the gas to the branch point 3 be made long enough to hold more than one pump charge the parting line between the saturated liquid in the tank and the unsaturated liquid in the pipe may oscillate to and fro in the pipe line but will make negligible progress, if the pipe is reasonably smooth, since the cross-section is inherently small and convection negligible. In other words, the pipe CP may be used with or substituted for the standpipe SP. In the former case the period of successful operation will be increased, although in the latter it may be quite satisfactory. From this and the drawings it will be seen that the volume of the withdrawable charge of the outlet chamber of the U-tube arrangement is greater than that of the liquid charge in the blind pressure chamber.

The combination of these methods is shown in Fig. 1, the coil CP representing the long pipe. This length may, if desired, be coiled or otherwise disposed or within the tank PT, if desired, in which case it may be formed of thin walls since the external and internal pressures will be substantially equalized. Another method of lengthening the pipe is to locate the tank at a distance from the branch point 3, the main requirement (in the absence of standpipe SP) being that the pipe be long enough to contain a greater volume than the liquid displacement between the predetermined maximum and minimum levels in the pressure tank PT.

*Variation of first form (Fig. 2)*

The above methods may be combined individually or both with still another method of minimizing the effects of convection currents. Into the bottom of the tank PT (Fig. 2) is placed a heavy liquid such as carbon tetra-chloride CT; above this a layer of glycerine GL and above this a layer of oil OL. It is desirable that the adjacent layers be substantially insoluble in one another and do not react chemically. They, or any of them, may or may not have substantial capacity for absorbing the gas. At the separation line between layers convection is wholly stopped or turned back so that convection currents are limited to relatively thin layers.

It is not that a layer acts primarily as an insulating medium to prevent the passage of gas by diffusion; in fact, it may be a poor insulator, but its form is such that the gas in solution cannot be transported far by circulation of the fluid and interchange of gas molecules between non-miscible liquid is practically prevented. Of course, the quantity of liquid in the lower layer must be such that the maximum changes in levels will not permit the layer above to pass around the lower end of the standpipe.

It will be noted from Fig. 2 that the unsaturated oil is again represented by straight broken lines and where it is in contact with the gas CG it is shown by stippling as having had diffusion of the gas take place therein. Glycerine is shown by wave-like lines and carbon tetrachloride by wave-like lines and vertical lines superimposed. Of course two liquids instead of three may be used, in such case, the carbon tetrachloride would be omitted and oil and glycerine used.

An advantage of the plural liquid system of Fig. 2 is that the liquid used in the pump and hydraulic power system may be different from that in the bottom of the tank or from that in contact with the gas. As shown, light oil is used in the pump and glycerine in the tank, with the carbon tetrachloride in the bottom of the tank.

*Operation of first form (Figs. 1 and/or 2).*

In order that the operation may be clear, it will be stated that the pump PU driven by motor M withdraws oil from the sump tank ST by way of lines 5 and 7, and delivers said oil to the pressure tank PT under pressure over lines 9, 11 and CP. Delivery is made into the pressure tank PT at the openings 1, and into the standpipe SP.

Oil in the tank PT is thus pressed against the charge of gas CG and stores energy. When the pressure goes up to a predetermined value, the pressure in line 15 causes the cut-out switch CO to cut out the motor M, whereupon the pump PU stops. It will be noted that the three-way valve TV has a valve element 17 which is normally spring-pressed shut, so that no liquid under pressure is admitted to the work cylinder WC but said cylinder may drain to the sump tank SP by way of a now-open element 19 of the three-way valve TV. When the element 19 is pressed in, the connection between the work cylinder WC and the sump tank ST is first shut off and subsequently the element 17 is opened, to permit pressure to flow to the work cylinder WC. Conversely the work cylinder WC is not placed in communication with the sump tank until the element 17 is closed.

On the sump tank ST is an outwardly opening check valve 21 which permits expiration of air from the tank SP but not inspiration of exterior air into said tank. Thus drainage back into the sump tank ST is assured, and the danger of condensation of moisture and the deposition of impurities from entering air is avoided. It will be understood that the expansive tendency of the air trap in the sump tank ST is enough to effect a delivery of liquid to the pump PU even though the expansion is sub-atmospheric. It may be further noted that the pump may be placed at or below the level of the sump tank.

*Second form (Fig. 3)*

In Fig. 3 is shown another form of the invention in which like numerals designate corresponding parts. In the illustration, the motor M and cut-out connection have been eliminated for purposes of simplification.

In this form of the invention the pressure tank PT is again divided into two compartments, except that the compartment near the outlet 1 instead of being in the form of a standpipe merely comprises a chamber 23 adjacent to a chamber 25, the two being separated by means of a wall 27, and being in communication at their lower portions by means of a crosspipe 29 having downwardly directed openings 31.

It will be noted that consistently with Fig. 1, the outlet 1 is placed at the upper end of the chamber in which the unsaturated oil is to exist, and that a baffle B is placed near the outlet. The chambers 25 and 23 correspond to the exterior and interior of the standpipe of Fig. 1, thus forming balanced columns of fluid under pressure, not unlike an elementary U-tube or manometer. The crosspipe 29 corresponds to the open lower end of the standpipe SP, or the juncture of a U-tube. Consistently with Fig. 1, the volume of the withdrawable charge in the outlet leg 23 is greater than the volume of the liquid charge in blind leg 25. This ensures that no saturated liquid, even if drawn into the outlet leg 23 from the leg 25, will ever reach the outlet line 3.

In Fig. 3 in order to further reduce the amount of convection in the chamber 23, there is provided above the pipe 29 a second baffle F and beneath this baffle is placed a mass of metallic gauze, such as steel wool, metal chips or the like Z for insuring slow circulation and convection. In the form shown in Fig. 3, oil OL is used as a working fluid and is shown as being saturated in the left-hand compartment 25 and saturated only at the bottom of the right-hand compartment 23. The oil OL in the right-hand compartment 23 which is near the mouth of the outlet 1 is unsaturated, as shown, due to the principles set forth above.

*Variation of second form (Fig. 4)*

In Fig. 4 is shown a variation of the invention shown in Fig. 3. Instead of using a single liquid such as oil OL, there is used oil OL together with another liquid such as glycerine GL, which, being heavier than oil, sinks to the bottom.

As shown above, the use of the glycerine inhibits convective currents and cross-mixing of saturated oil OL in the left-hand chamber with unsaturated oil OL in the right-hand chamber. Furthermore, the surfaces effected between layers of liquid cause a serial resistance against direct diffusion. Thus the presence of dissolved gas in the lower portion of compartment 23 is substantially, if not quite, prevented.

*Third modification (Fig. 5)*

In Fig. 5 is shown a simple form of the invention using a plurality of fluids in the pressure tank PT. In this case the tank is not divided into compartments forming the equivalent of a U-tube or the like, such as referred to above. In this case the outlet 1 is placed with respect to the compressed gas, so that there is interposed between the working fluid GL (glycerine) and said gas CG a layer of oil OL. This oil may become saturated as shown in Fig. 5 but diffusion into the glycerine is greatly inhibited so that for a very great and practical period of time the system is operating with unsaturated glycerine.

*Summary of features of Figs. 1–5*

From the above, it will be seen that one feature of the invention comprises stratifying the working fluid so that convection currents are interfered with. Another feature comprises the use of one liquid as a perfectly sealing blanket over another to prevent diffusion into the ultimate liquid to be used as a working substance. Another feature is the reduction of velocity and turbulence in the region where unsaturated fluid is desired, that is, near the outlet of the pressure tank PT. Another feature is the fact that the parts are arranged so that the heavier saturated fluid gravitates to a point which is distant from said outlet, the construction being such that the reduction in circulating currents is enough to prevent the heavier saturated fluid from rising to a place near said outlet.

It will be noted that the baffle F and the gauze Z are not shown in Fig. 4. This is to illustrate the point that when the pressure tank PT is mounted on a vehicle and subject to agitation as a whole I choose to prevent most of the convection and splashing by filling at least the lower part of the tank with fine material such as the steel wool or metal shavings and the baffles shown in said Fig. 3. The unbaffled system may be used in structures at rest (Fig. 4).

It is to be understood that the fluids mentioned are not limiting, and that any non-miscible liquids may be used in contact. Thus in a water supply system the top of the water in the tank may be covered with a layer of oil, not primarily for the purpose of adding an insulating layer impervious to air, because the oil may be even more pervious than the water, but to limit the length of path of convection currents.

*Mechanical embodiment (Figs. 6–14)*

In Figs. 6 to 14 is shown how the invention may be compactly embodied in a mechanical structure. Referring to Fig. 6 it will be seen that the pressure tank PT is made of an ovate form having a partition 27 and outlet pipe 4 therein. To this tank PT is welded a cylinder 33 which with the aid of a hermetically sealed wall 35 forms the sump tank ST. A hermetically sealed head 37 encloses the structure. Prior to closing and hermetically sealing, the parts shown in Fig. 6 are placed within the cylinder 33. Thus a fool proof compact structure is effected. The motor M, pump PU, switch CO and auxiliary parts to be described are interiorly located as shown.

In Figures 6–14 I have shown what was referred to above as the form of the invention in which the motor and pump PU are cut out by action of a float. This is done by linking the switch CO by means of a link 39 with a lever 41 on a shaft 43. The shaft 43 passes through a bushing 45 into the sump tank ST where it is operated by a lever 47 and a connecting rod 49 reaching to a float 51. Thus when the level in the sump tank is subnormal, the motor M is cut out, this being an indication that enough liquid has been withdrawn and delivered to the pressure tank to effect the rise of pressure for which the system is designed.

Further describing Figs. 6 to 14, it will be seen that liquid is withdrawn from tank ST by way of line 5, the same passing through a suitable strainer 53 and being drawn through a constantly open auxiliary port 55 (see Fig. 8) forming an auxiliary to said three-way valve TV. From this point the liquid is drawn over the continuation of line 5 through the pump PU and then driven over a line 57, through a constantly open passage 87 (Fig. 7) forcing open the poppet valve 17 and to the pressure tank by way of port 59 and line 61. Valve 17 thus acts as a check valve preventing back flow through the pump slippage when the pump is not running. It also acts as a seal preventing the slight flow from the tank PT through the slight slip of the piston valve 19 when the latter is in position to close port 108.

In order to operate the valve 17 which is normally held shut by a spring 67, I provide the valve with a stem 69 engageable by the second valve element 19. The element 19 is fastened to an operating plug 71, the latter working in a cylinder 73 which, by means of a communicating passage 75 and a pipe 77 communicates with a master cylinder 79 having a piston 81 therein operable through a spring 83 by a foot pedal 85. It is to be understood that the hydraulic connection shown between the spring 83 and the plug 71 may be replaced by a mechanical one.

When the pedal 85 is depressed, the liquid in the pipe 77 and passage 75 is pressed so as to move the plug 71 to the left (Fig. 10). Otherwise, the plug is moved to the right by action of the spring 67 (Fig. 7). If the plug is at the right, as is shown in Fig. 7 (foot off the pedal 85), then the valve 17 is shut. Whether or not the motor M will operate, depends upon conditions of the float in the sump tank ST.

When it is desired to operate the brake, the pedal 85 is depressed, whereupon the plug 71 is forced to the left, thus opening the valve 17 and permitting pressure to flow from the passage 59

(which communicates with the pressure tank PT) by way of the passage 87 and the by-pass 91, passages 93, 95 and to the pipe 97 passing to the work cylinder. When the foot is released, the ultimate position is shown at Fig. 7, wherein the work cylinder may drain by way of pipe 99 through passage 101, passages 103 (Fig. 9), passage 105, passages 107 (Fig. 12) and thus to the sump tank ST by way of line 109.

I have found that the best brake operation is effected by systems wherein the reaction to leg or hand pressure increases with the distance that a pedal or the like is depressed, that is, the operator can best judge of the manner in which the vehicle is being decelerated or other effects accomplished by having his control increase its reaction proportionally to displacement, as in the case of the ordinary automobile brake. In order to simulate these conditions in the present system, the length L of the valve 19 is made slightly longer than the distance between corresponding cut-off edges of ports 107 and 108. Thus an amount of exhaust lap is introduced so that exhaust cannot take place while fluid under pressure is being delivered.

To effect said reaction on the operator's limb, the passage 93 is made to communicate with the cylinder 73 which holds the plug 71. Thus the left hand side of the plug 71 is subjected to the working pressure leading to the brake cylinder.

In view of the above, when the pedal 85 is depressed, the spring 83 is first compressed, thus putting pressure on the fluid in the separate hydraulic transmission system controlled thereby. This system causes the movement of the plug 71 and is the one which may have a mechanical substitute.

As soon as the plug 71 moves, the valve 17 opens, thus permitting pressure to flow against the side of the plug 19, the plug 71 finally moving to a position where the exhaust port 107 is closed just ahead of the time at which the port 108 opens.

When the port 108 opens, pressure flows to the work cylinders by way of the passages 93 and 95, and at the same time delivers the same unit pressure against the plug 71 so that it is forced back so as to react against the fluid in the cylinder 79 and the spring 83 therein. This effects a proportional reaction on the operator's foot.

At the same time the spring 67, in expanding, sets the valve 19 back into a position where it cuts off the flow from the by-passage 91. The valve 19 being slightly longer than the distance between corresponding edges of exhaust port 107 and supply port 108, results in pressure being cut off without effecting exhaust port opening, so that under these conditions the work cylinder is not exhausted, nor is more pressure introduced; and the plug 71 remains in equilibrium, as well as the piston 81 and the foot pedal 85, that is, as long as the operator's foot remains physically, constantly tensioned against the pedal.

If the operator wishes to place more pressure in the work cylinder, he further depresses the pedal 85 and the said functions are repeated, the valve 19 first moving to the left to slightly uncover the port 108 so as to introduce more pressure into the work cylinder, thereupon also introducing more pressure against the plug 71 and setting up a greater reaction thereon. The plug 71 then returns, as does the portion of the valve 19 so that equilibrium is again set up under new pressure conditions at the pedal 85.

When pressure is taken off of the pedal 85, the pressure on the plug 71 sends it to the right, thus cutting off the pressure supply at passage 108 to the work cylinder, and opening the exhaust passage 107.

Attention is called to the compactness of the structure shown in Fig. 6, wherein substantially all the parts are positioned within a tank-like structure which may be even smaller than the ordinary pressure tank now used for air braking of vehicles. From this, it will be seen how the device may be advantageously used on vehicles and the like.

In connection with Fig. 6, it is also pointed out that the manifold 111 for the valve TV reaches through the cylindrical structure 33 at a single opening 113 hermetically sealed. The purpose of this is to provide one opening for making the various exterior connections shown.

It will be noted that the valve TV shown in Figs. 1 to 5 is illustrative of such fractions of the valve TV shown in Fig. 6 as is needed to describe said diagrammatic Figs. 1–5. The tension spring 54 is illustrative of the automatic foot reaction means above described. The cross connection 56 illustratively provides the balanced condition for the valve. The poppet feature and others are omitted for clarity.

In view of the above, it will be seen that the several objects of the invention are achieved and other advantageous results are attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A hydro-pneumatic pressure system comprising means forming blind and outlet chambers respectively connected downwardly, the blind one of said chambers having a compressed gas therein and at least one fluid below the gas and extending into the outlet chamber, the outlet chamber having an outlet connection, means for forcing liquid to and taking the same from said outlet chamber at an elevated point therein baffle means between said connection and the communicating means between the chambers, the volume of the charge up to the point of outlet of the outlet chamber being greater than the liquid charge in the blind chamber.

2. A hydro-pneumatic pressure system comprising means forming blind and outlet chambers connected downwardly, the blind one of said chambers having a compressed gas therein and liquid engaged by the gas, some of said liquid being also in the outlet chamber, means including an opening for passing liquid to and from said outlet chamber at an elevated point therein, baffle means between said opening and the communicating means between the chambers, and a layer of another liquid located between said opening and said gas, the volume of the charge up to the point of outlet of the outlet chamber being greater than the liquid charge in the blind chamber.

3. A hydro-pneumatic pressure system comprising means forming blind and outlet chambers connected downwardly, the blind one of said chambers having a compressed gas therein at an elevated region and liquid below the gas, said liquid extending into the outlet chamber, and means for passing liquid to and from said outlet chamber at an elevated point therein, said liquid having at least one other heavier liquid therein located between said opening and said gas, the volume of the charge up to the point of outlet of the outlet chamber being greater than the liquid charge in the blind chamber.

4. Hydro-pneumatic apparatus comprising a vessel formed therein to effect separated columns of fluid under balanced pressure and arranged in U-form, one of the columns including a gas and a liquid subjected directly to diffusion of said gas, and the other of said columns having therein a quantity of said liquid, the charge of liquid in the latter column having an outlet, the elevation of the outlet being such that the charge of liquid in said latter column up to the point of outlet is greater than the charge of liquid in the column under the gas.

5. Hydro-pneumatic apparatus comprising a vessel having therein columns of fluid under balanced pressure, one of the columns including a gas under pressure, a liquid subject to diffusion of said gas, and the other of said columns having at the head thereof a quantity of said liquid not subjected to any substantial amount of said diffusion, and means for introducing and withdrawing liquid from near the head of said second-named column, the charge of liquid in the second-named column to the outlet being greater than the liquid charge in the column which includes the gas.

6. Hydro-pneumatic apparatus comprising a vessel having therein columns of fluid under balanced pressure, one of the columns including a gas under pressure, a liquid subject to diffusion of said gas, and the other of said columns having therein a quantity of said liquid, means for introducing and withdrawing liquid from the head of said second-named column, the charge of liquid in the second-named column to the outlet being greater than the liquid charge in the column which includes the gas and a second liquid at the bases of said columns, said second liquid having a specific gravity which is greater than that of said first-named liquid.

7. In hydro-pneumatic apparatus, a vessel having columns of fluid therein under pressure balance, said columns being downwardly connected and one of them having a gas under pressure therein and a liquid subjected to diffusion of said gas, and the other of said columns having a quantity of said liquid which is unsaturated, means for introducing and withdrawing liquid at the upper end of said second-named column, the quantity of liquid in the second column to the point of withdrawal being greater than the quantity of liquid in the other column, and baffle means located between said point of withdrawal and the point of communication between the columns.

8. In hydro-pneumatic apparatus, a pressure tank for liquid and gas under pressure, a sump tank adjacent to said pressure tank, a pump, a motor for driving said pump and withdrawing liquid from the sump tank and delivering it to said pressure tank, valve means controlling flow of liquid from said pressure tank to a point of use, and hermetically sealed enclosure, said motor, pump and valve being integrated within said enclosure and including said pressure and sump tanks, said valve having a manifold extending from the enclosure, said structure being substantially of a cylindrical shape.

9. In hydro-pneumatic apparatus, means forming separate but connected chambers, one of said chambers forming a blind pocket and containing a gas under pressure and also a liquid subjected to the pressure of said gas whereby the liquid may become saturated, the other chamber constituting an outlet chamber having an outlet, saturated liquid in the outlet chamber at the region of said connection with the blind chamber and unsaturated liquid thereabove, said outlet being in the region of the unsaturated liquid, a sump, a pump adapted to pump a charge of liquid from the sump into the outlet chamber, the volume of unsaturated liquid in the outlet chamber being greater than the said charge.

10. In hydro-pneumatic apparatus, means forming separate but connected chambers, one of said chambers forming a blind pocket and containing a gas under pressure and also a liquid subjected to the pressure of said gas whereby the liquid may become saturated, the other chamber constituting an outlet chamber having an outlet, saturated liquid in the outlet chamber at the region of said connection with the blind chamber and unsaturated liquid thereabove, said outlet being in the region of the unsaturated liquid, a sump, a pump adapted to pump a charge of liquid from the sump into the outlet chamber, the volume of unsaturated liquid in the outlet chamber being greater than the said charge and said charge being less than the liquid in the pocket chamber.

11. In hydro-pneumatic apparatus, means forming separate chambers downwardly connected, one of said chambers being blind-ended and containing a gas and a liquid subjected to the pressure of said gas, the other chamber having therein a quantity of liquid and an upwardly located opening to form an outlet chamber, a sump, a pump adapted to pump a charge of liquid from said sump into the outlet chamber, and pump control means responsive to pressure conditions in the said chambers adapted to determine said charge, the volume of liquid in the outlet chamber being greater than said charge.

12. In hydro-pneumatic apparatus, means forming separate but connected chambers, one of said chambers forming a pocket and containing a gas under pressure and also a liquid subjected to the pressure of said gas whereby the liquid may become saturated, the other chamber constituting an outlet chamber having an outlet, saturated liquid in the outlet chamber at the region of said connection with the blind chamber and unsaturated liquid thereabove, said outlet being in the region of the unsaturated liquid, and means for effecting a charge, the volume of unsaturated liquid in the outlet chamber being greater than the said charge.

13. In hydro-pneumatic apparatus, means forming separate chambers downwardly connected, one of said chambers forming a blind pocket and containing a gas and a liquid subjected to the pressure of and saturation by said gas, the other chamber having therein a quantity of liquid and an upwardly located opening to form an outlet chamber, a sump, a pump adapted to pump a charge of liquid from said sump into the outlet chamber, control means responsive to pressure conditions in the chambers adapted to determine said pump charge, the unsaturated liquid in the outlet chamber being greater than a single charge, a charge being substantially less than the variation in volume of liquid in the blind chamber by an amount adapted to permit of a plurality of withdrawals from the outlet chamber without escape of gas from the blind chamber.

HARVEY S. PARDEE.